US009952782B1

(12) United States Patent
Chandrasekaran et al.

(10) Patent No.: US 9,952,782 B1
(45) Date of Patent: Apr. 24, 2018

(54) METHOD AND SYSTEM FOR ACCESSING DATA BETWEEN DIFFERENT VIRTUAL DISK FORMATS IN A VIRTUALIZATION ENVIRONMENT

(71) Applicant: Nutanix, Inc., San Jose, CA (US)

(72) Inventors: Karthik Chandrasekaran, Bangalore (IN); Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 560 days.

(21) Appl. No.: 14/586,700

(22) Filed: Dec. 30, 2014

(51) Int. Cl.
*G06F 3/06* (2006.01)

(52) U.S. Cl.
CPC .......... *G06F 3/0619* (2013.01); *G06F 3/0647* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| 8,601,473 | B1 | 12/2013 | Aron et al. | |
|---|---|---|---|---|
| 2011/0202640 | A1* | 8/2011 | Pillutla | G06F 9/5077 709/221 |
| 2015/0324217 | A1* | 11/2015 | Shilmover | G06F 9/45558 718/1 |
| 2016/0188232 | A1 | 6/2016 | Ramachandran et al. | |

OTHER PUBLICATIONS

Feresten, Paul, et al., "The NetApp Virtual Storage Tier", NetApp, 2011, 11 pages.
VMware, "Virtual Disk Manager User's Guide", Virtual Disk Development Kit, Copyright 2008, 12 pages.
Diskeeper Corporation, "Virtualization and Disk Performance", Copyright 2006, 7 pages.
VMware, "Virtual Disk API Programming Guide", VMware Virtual Disk Development Kit 1.1, Copyright 2008-2009, 60 pages.
Tang, Chunqiang, "FVD: a High-Performance Virtual Machine Image Format for Cloud", 2011, 6 pages.
Joshi, Abhinav, et al., "Best Practices for File System Alignment in Virtual Environments", Version 1.0, NetApp, Copyright 2009, 25 pages.

* cited by examiner

*Primary Examiner* — Kenneth Tang
(74) *Attorney, Agent, or Firm* — Vista IP Law Group, LLP

(57) ABSTRACT

An architecture for accessing data between different virtual disk formats. A virtual machine may be migrated or cloned from a first server that uses a first virtual disk format to a second server using a second virtual disk format. In response to an I/O request from the virtual machine, a real-time mapper compares the virtual disk format used by the virtual machine with the virtual disk format of the virtual disk that the request is directed to. If the formats are different, a set of mapping metadata is used to map between data of the different virtual disk formats. Due to the mapping being performed in real time, the virtual machine is able to operate upon the virtual disk without the need to perform a potentially costly format conversion of the virtual disk or the underlying data.

33 Claims, 17 Drawing Sheets

METHOD AND SYSTEM FOR ACCESSING DATA BETWEEN DIFFERENT VIRTUAL DISK FORMATS IN A VIRTUALIZATION ENVIRONMENT

CROSS REFERENCE TO RELATED APPLICATIONS

The present application is related to U.S. Pat. No. 8,601,473, entitled "ARCHITECTURE FOR MANAGING I/O AND STORAGE FOR A VIRTUALIZATION ENVIRONMENT", filed on Aug. 10, 2011, and U.S. application Ser. No. 14/586,614, filed on even date herewith, entitled "SYSTEMS AND METHODS FOR IMPLEMENTING STRETCH CLUSTERS IN A VIRTUALIZATION ENVIRONMENT", and which are hereby incorporated by reference in their entirety.

FIELD

This disclosure concerns an architecture for accessing data between different virtual machine formats.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

How virtual machines are represented in the underlying storage depends on a virtual disk format used by the server or host on which the virtual machine is created. For example, ESXi and Hyper-V are two common formats that may be used in virtualization environments. A virtual machine created on a server or host running on the ESXi format will map to the virtual disk differently from a virtual machine created on a server or host running the Hyper-V format.

However, in many cases, it may be desirable to be able to move a virtual machine between servers or hosts running different virtual disk formats. For example, an organization may make a business decision to change the type of format used in their virtualization environment (e.g., from ESXi to Hyper-V, or vice versa), while desiring to be able to continue using their existing virtual disks. In some cases, a virtualization environment may contain a number of different servers running on different formats, wherein virtual machines may be moved between the different servers in the virtualization environment for load-balancing purposes.

Typically, in order to move a virtual machine between servers running different virtual disk formats, the virtual machine must be powered down. Once powered down, a conversion is performed on the virtual disk (e.g., reading the virtual disk data, performing a format conversion, and writing back the re-formatted virtual disk data). However, this type of conversion is typically time-consuming, and requires a large amount of storage overhead.

Therefore, there is a need for an improved approach for using virtual machines in a virtualization environment with different virtual disk formats.

SUMMARY

Embodiments of the present invention provide an architecture for accessing data between different virtual disk formats. In some embodiments, a virtual machine is migrated or cloned from a first server that uses a first virtual disk format to a second server using a second virtual disk format. In response to an I/O request from the virtual machine, a real-time mapper compares the virtual disk format used by the virtual machine with the virtual disk format of a virtual disk that the request is directed to. If the formats are different, a set of mapping metadata is used to map between data of the different virtual disk formats. Due to the mapping being performed in real time, the virtual machine is able to operate upon the virtual disk without the need to perform a potentially costly format conversion of the virtual disk or the underlying data.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Embodiments of the present invention provide an architecture for accessing data between different virtual disk formats. In some embodiments, a virtual machine is migrated or cloned from a first server that uses a first virtual disk format to a second server using a second virtual disk format. In response to an I/O request from the virtual machine, a real-time mapper compares the virtual disk format used by the virtual machine with the virtual disk format of a virtual disk that the request is directed to. If the formats are different, a set of mapping metadata is used to map between data of the different virtual disk formats. Due to the mapping being performed in real time, the virtual machine is able to operate upon the virtual disk without the need to perform a potentially costly format conversion of the virtual disk or the underlying data.

Figure 1:
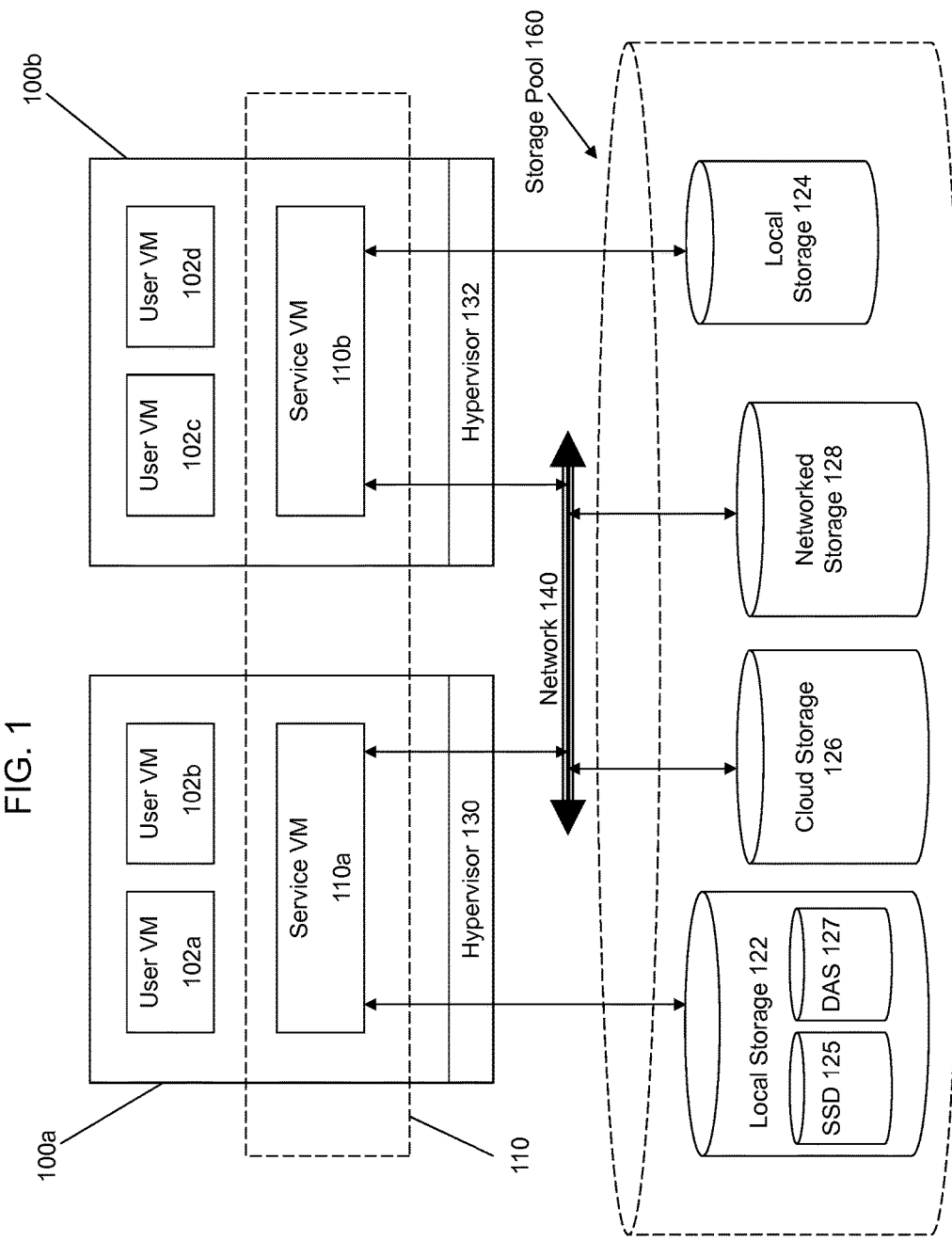
FIG. 1 illustrates an example architecture to implement I/O and storage device management in a virtualization environment according to some embodiments.

FIG. 1 illustrates an architecture for implementing storage management in a virtualization environment according to some embodiments. The architecture of FIG. 1 can be implemented for a distributed platform that contains multiple servers 100a and 100b that manages multiple tiers of storage. The multiple tiers of storage may include storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Service VM". This is the "Storage Controller" in the currently described architecture. Multiple such storage controllers coordinate within a cluster to form a single-system. The Service VMs 110a/110b are not formed as part of specific implementations of hypervisors 130/132. Instead, the Service VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Figure 2:
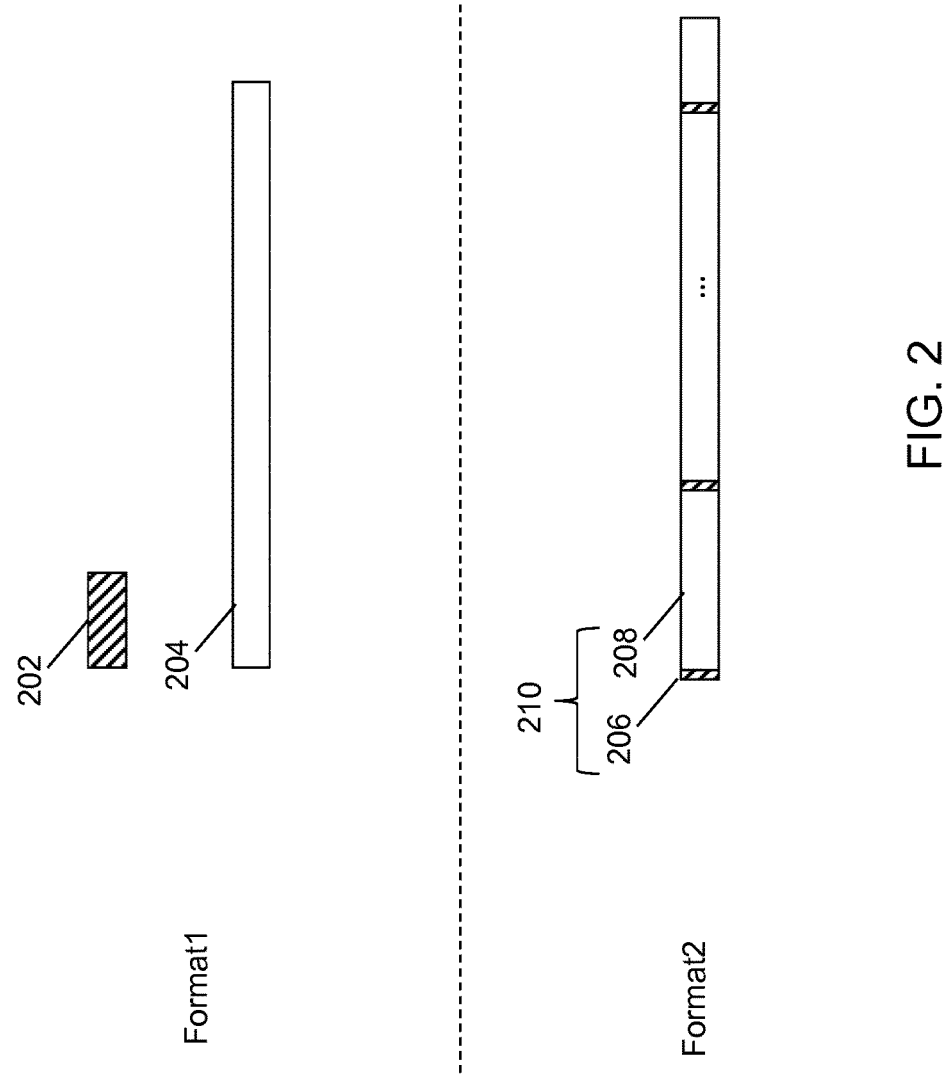
FIG. 2 illustrates different types of virtual disk formats that may be used in a virtualization environment in accordance with some embodiments

FIG. 2 illustrates two different types of virtual disk formats that may be used in a virtualization environment in accordance with some embodiments of the invention, hereinafter referred to as Format1 and Format2. While the specification will refer primarily to the illustrated virtual disk formats of FIG. 2 for the purposes of example, it is understood that in various embodiments any types of virtual disk formats may be used.

In some embodiments, different virtual disk formats differ by how the raw data used by the virtual machine and the metadata describing the form of the raw data are stored. For example, data stored using Format1 comprises a data file 204 containing raw data, and a separate metadata file 202 containing the metadata. In some embodiments, metadata file 202 is a small text file that describes a format of data file 204. For example, data file 204 may be in the form of a flat data file, which is reflected by the metadata in metadata file 202.

On the other hand, data stored using Format2 is stored as a single file 210 containing one or more alternating metadata portions 206 and raw data portions 208. In some embodiments, metadata portions 206 are small in size in comparison to data portions 208. For example, while the total size of file 210 may be many gigabytes, each metadata portion 206 may only be a single megabyte in size.

While data stored in Format1 and Format2 may contain the same raw data (i.e., the data from data file 204 and data portions 208), due to the different arrangement of the raw data and metadata, a VM on server using Format1 will not be able to perform I/O requests on a vDisk that uses Format2, and vice versa.

Figure 3:
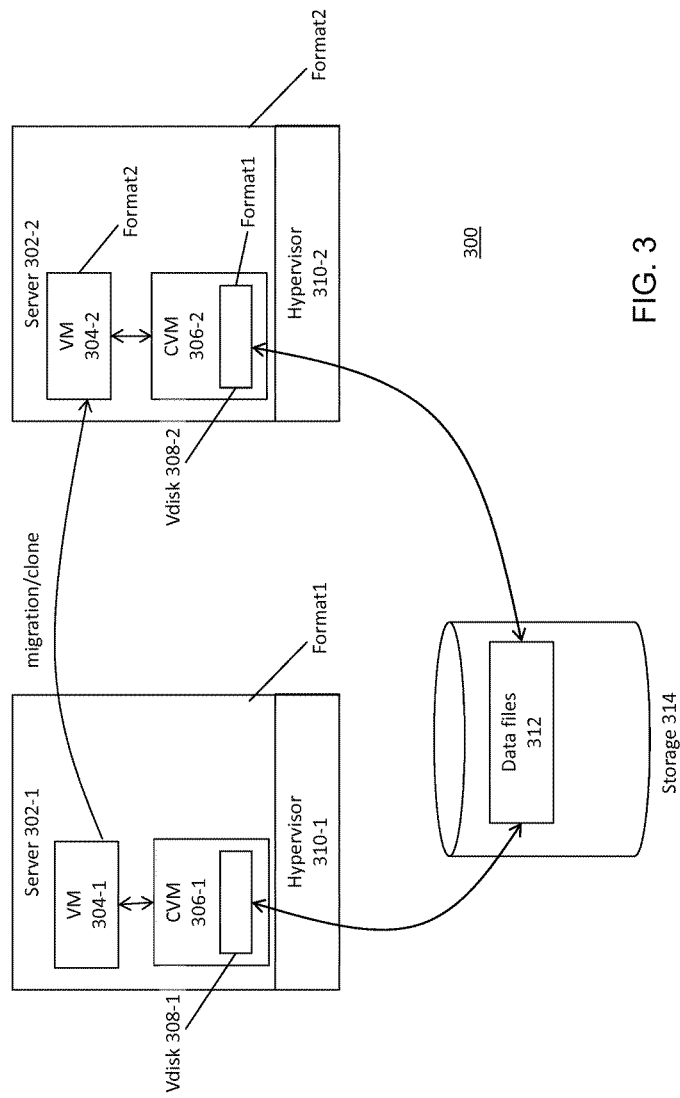
FIG. 3 illustrates an architecture of a virtualization environment 300 in accordance with some embodiments.

FIG. 3 illustrates an architecture of a virtualization environment 300 in accordance with some embodiments. Virtualization environment 300 contains a first VM 304-1 that resides on a first server 302-1 using a hypervisor 310-1. The virtual disk format used by first server 302-1 is Format1 (as illustrated in FIG. 2).

VM 304-1 is configured to access a vDisk 308-1 through a first service VM (also referred to as a controller VM, or CVM) 306-1, wherein vDisk 308-1 abstracts underlying data files 312 located on storage 314. Due to the formats of vDisk 308-1 and VM 304-1 both being in Format1, VM 304-1 is able to perform I/O requests on vDisk 304-1.

It is understood that although storage 314 is represented as a single storage device, storage 314 may actually correspond to a single storage device or a plurality of different storage devices. In addition, it is understood that the data of data files 312 may be located on a single storage device, or be distributed over a plurality of storage devices.

At some point in time, VM 304-1 and its associated vDisk 308-1 are migrated or cloned to form VM 304-2 and vDisk 308-2 on a second server 302-2 using a hypervisor 310-2. Second server 302-2 uses a format (e.g., Format2) that is different from the format used by hypervisor 310-1 on server 302-1. This may be done in response to a business or administrative decision to change the virtual disk format of the virtualization environment (e.g., from Format1 to Format2). Alternatively, VM 304-1 may have been migrated between servers 302-1 and 302-2 as part of an automated load-balancing scheme.

However, even though server 302-2 uses Format2 instead of Format1, vDisk 308-2 will, until a conversion operation is run, remain in its original format (Format1). On the other hand, I/O requests issued by VM 304-2 will be directed at a vDisk having its data in Format2. Thus, the vDisk format expected by the I/O and the actual vDisk format will be different (i.e., Format2 and Format1, respectively). Typically, until the format of the vDisk has been converted to match that used by the VM, the VM will be unable to issue I/O requests to the vDisk. However, conversion operations are typically time-consuming and require powering down the VM, leading to undesired downtime.

Figure 4A:
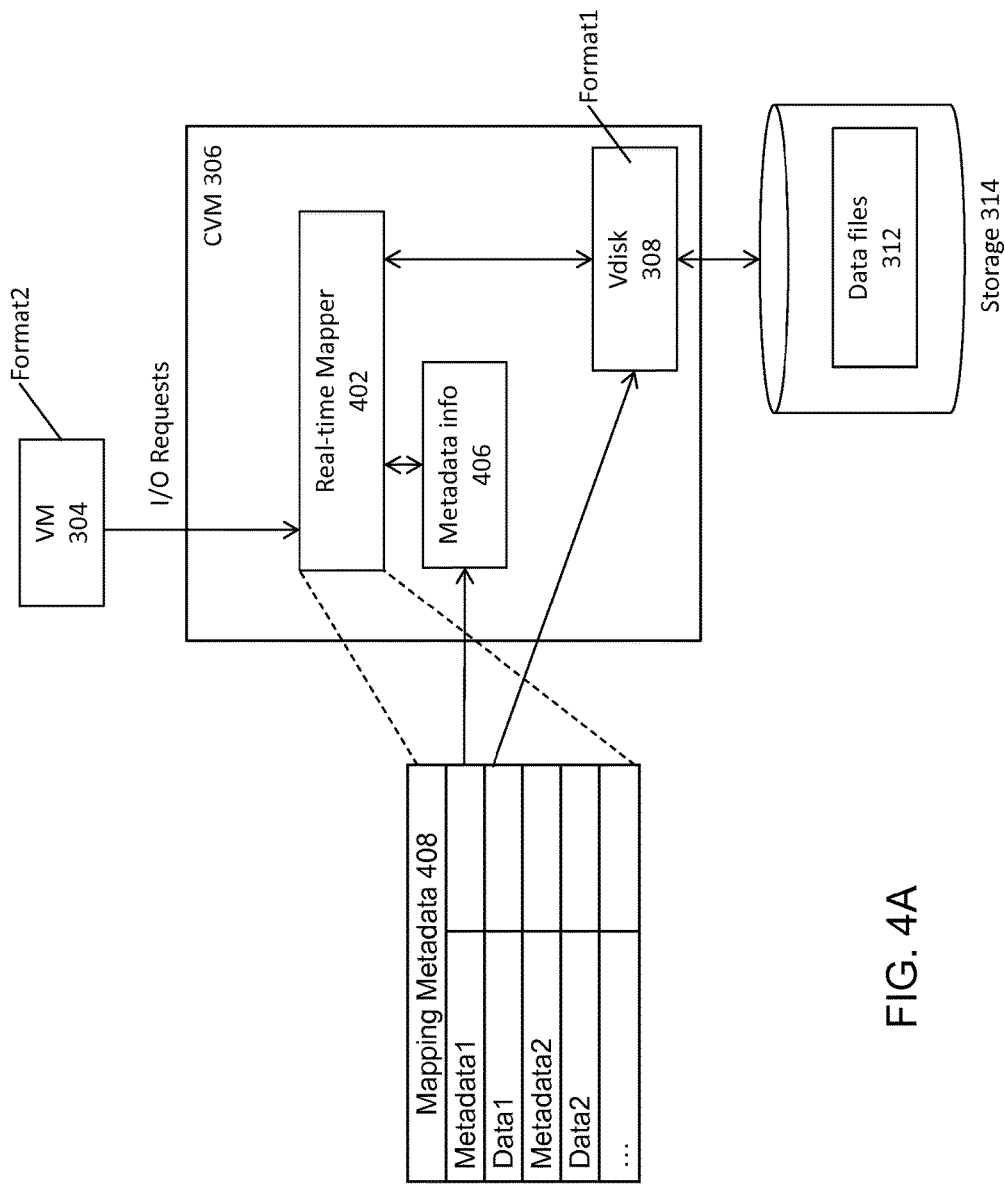
FIG. 4A illustrates a CVM that implements mapping between different virtual disk formats in accordance with some embodiments

In order to allow VM 304-2 to operate upon vDisk 308-2 without having to perform a potentially time-consuming conversion process on the vDisk, CVM 306-2 implements a set of mappings between the different virtual disk formats. For example, FIG. 4A illustrates a CVM 306 that implements mapping between different virtual disk formats in accordance with some embodiments. CVM 306 implements a real-time mapper 402 to receive I/O requests from VM 304. When an I/O request is received, real-time mapper 402 determines whether the VM 304 that issued the I/O request is running on a different format from vDisk 308, and if so, implements mappings between the two different formats using mapping metadata 408. The mapping translates vDisk 308 into the format expected by VM 304, such that the I/O request from VM 304 will be able to operate upon vDisk 308.

In some embodiments, real-time mapper 402 will also create additional metadata information 406, based upon the vDisk data and the virtual disk format used by the VM. This is because while raw data can in some embodiments be mapped directly between different virtual disk formats, the metadata generally cannot, thus necessitating the creation of new metadata.

On the other hand, if real-time mapper 402 determines that VM 304 and vDisk 308 are running the same format (e.g., both running Format1), then no mapping is required, and the I/O request is sent directly to vDisk 308 without being mapped using mapping metadata 408.

Figure 4B:
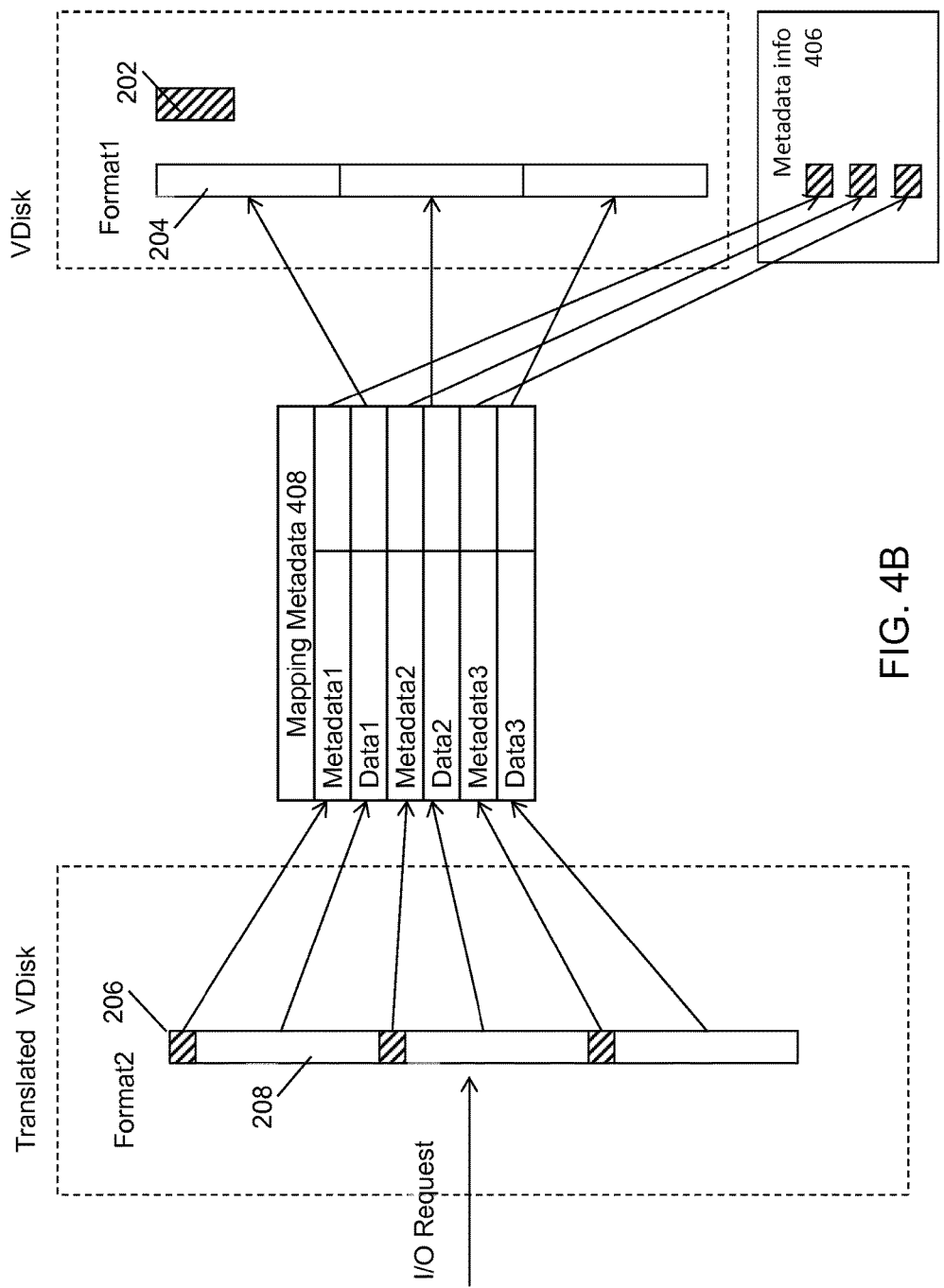
FIGS. 4B and 4C illustrate mappings between different formats in accordance with some embodiments.
Figure 4C:
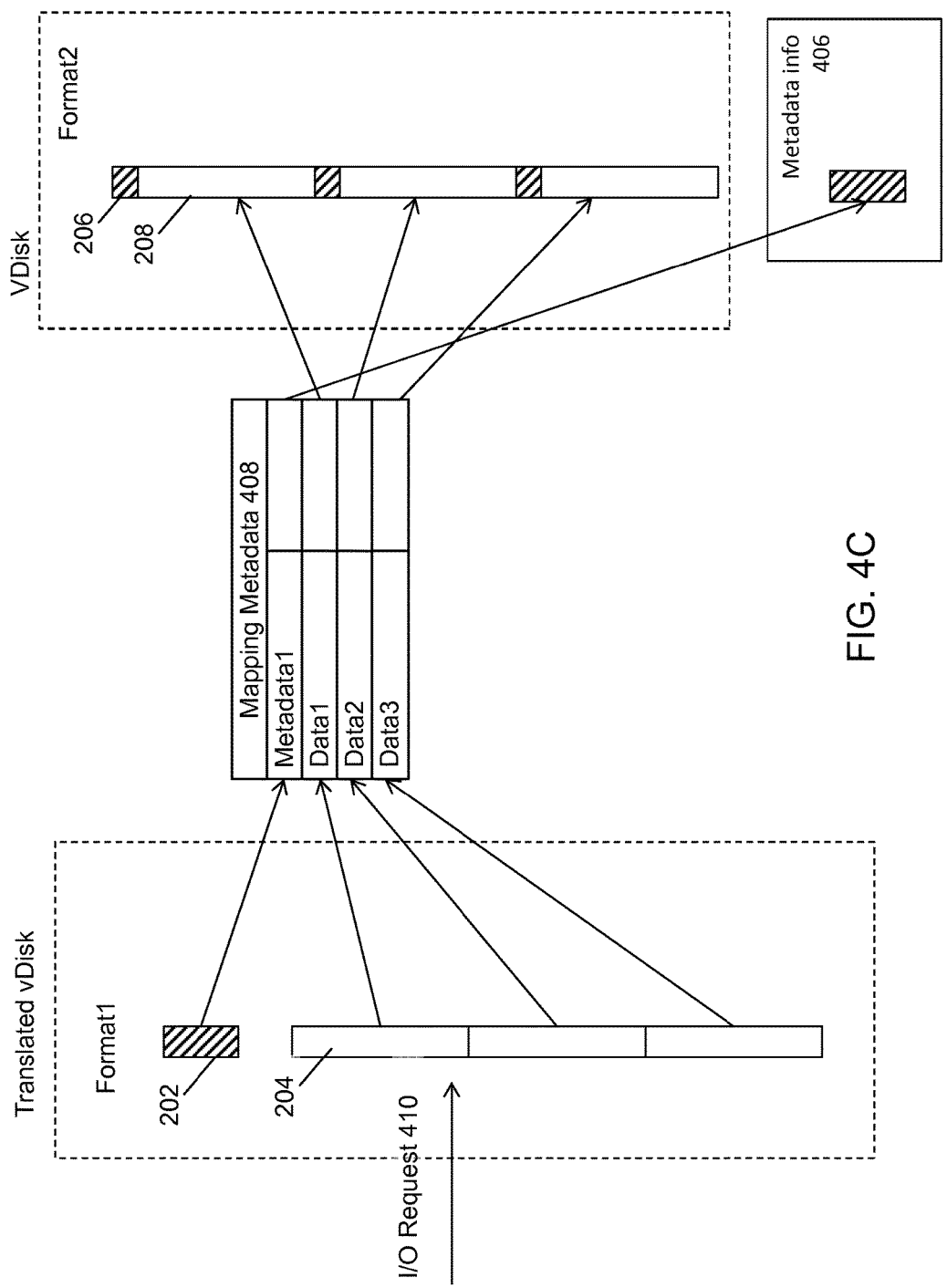

FIGS. 4B and 4C illustrate mappings between different formats in accordance with some embodiments. FIG. 4B illustrates mappings to translate Format2 to Format1, while FIG. 4C illustrates mappings to translate Format1 to Format2.

When an I/O request 410 from a VM using Format1 is issued to a vDisk using Format2, mapping metadata 408 is used to translate the I/O to a format of the underlying vDisk, such that the VM in effect "sees" a translated vDisk that is in Format1, despite the underlying vDisk actually being in Format2. When mapping Format2 to Format1 as illustrated in FIG. 4B, I/O requests for data sections 208 used in Format2 are mapped to portions of data file 204 of Format1. On the other hand, metadata sections 206 of Format2 cannot be directly mapped to the metadata file 202 used in Format1. Instead, separate metadata information 406 is created that corresponds to the metadata sections 206 of the Format2 data. In some embodiments, this separate metadata information 406 is stored and maintained locally on the server by real-time mapper 402. Thus, during operation, an I/O request for a portion of data 208 will retrieve, through the mapping metadata 408, a corresponding portion of data from data file 204, while I/O requests for metadata portions 206 will, through mapping metadata 408, retrieve the corresponding metadata information 406.

Similarly, when mapping from Format1 to Format2 as illustrated in FIG. 4C, I/O requests directed to data file 204 used in Format1 are mapped to the data sections 208 of Format2. On the other hand, requests for metadata file 202 used in Format1 cannot be mapped directly to metadata sections 206 used in Format2. Instead, separate metadata information 406 is created that corresponds to metadata file 202.

Figure 4D:
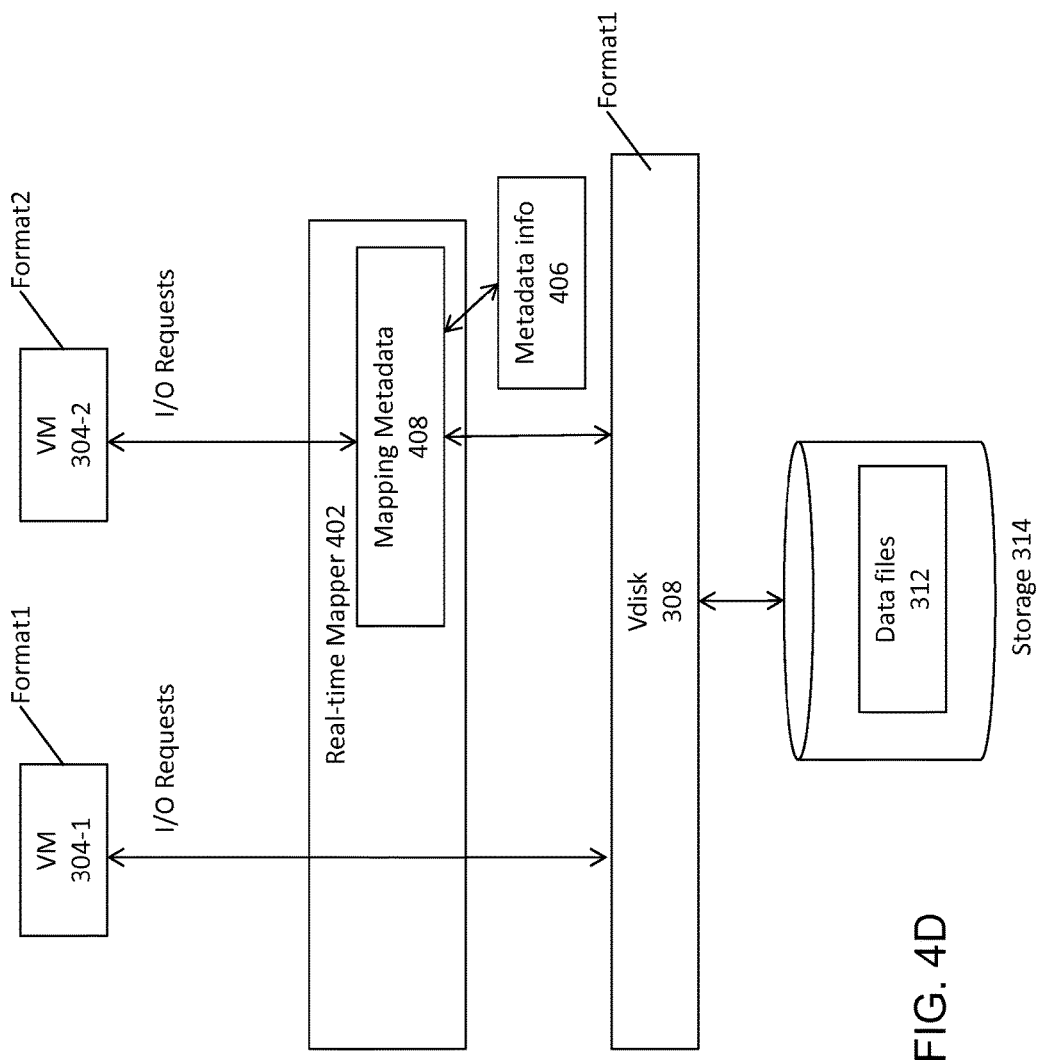
FIG. 4D illustrates a real-time mapper that can be used with multiple types of VMs in accordance with some embodiments.

FIG. 4D illustrates a real-time mapper 402 that can be used with multiple types of VMs in accordance with some embodiments. In the illustrated embodiment, vDisk 308 (which uses Format1) may be operated upon by VMs 304-1 and 304-2, which use virtual disk formats Format1 and Format2, respectively. When VM 304-1 issues an I/O request to vDisk 308, no mapping needs to be performed, due to VM 304-1 and vDisk 308 using the same format (Format1). On the other hand, when VM 304-2 issues an I/O request to vDisk 308, mapping metadata 408 will be used to map the data requested by VM 304-2 to corresponding locations on vDisk 308, based upon the respective formats of VM 304-2 and vDisk 308. In addition, requested metadata in the I/O request is mapped to metadata information 406 maintained by the real-time mapper 402.

Thus, as can be seen in FIG. 4D, the use of real-time mapper 402 allows for vDisk 308 to be used with different VMs 304 running on different virtual disk formats, without having to perform a conversion on vDisk 308 or underlying data files 312. Due to the mapping being performed in real-time, I/O requests from VMs running on the different virtual disk formats can be fulfilled by the vDisk without incurring downtime associated with format conversion of the vDisk. In addition, if a particular VM is regularly moved between different servers using different virtual disk formats, the use of real-time mapping allows for the VM to continue to operate upon the vDisk, without ever having to perform a conversion on the vDisk.

Figure 5:
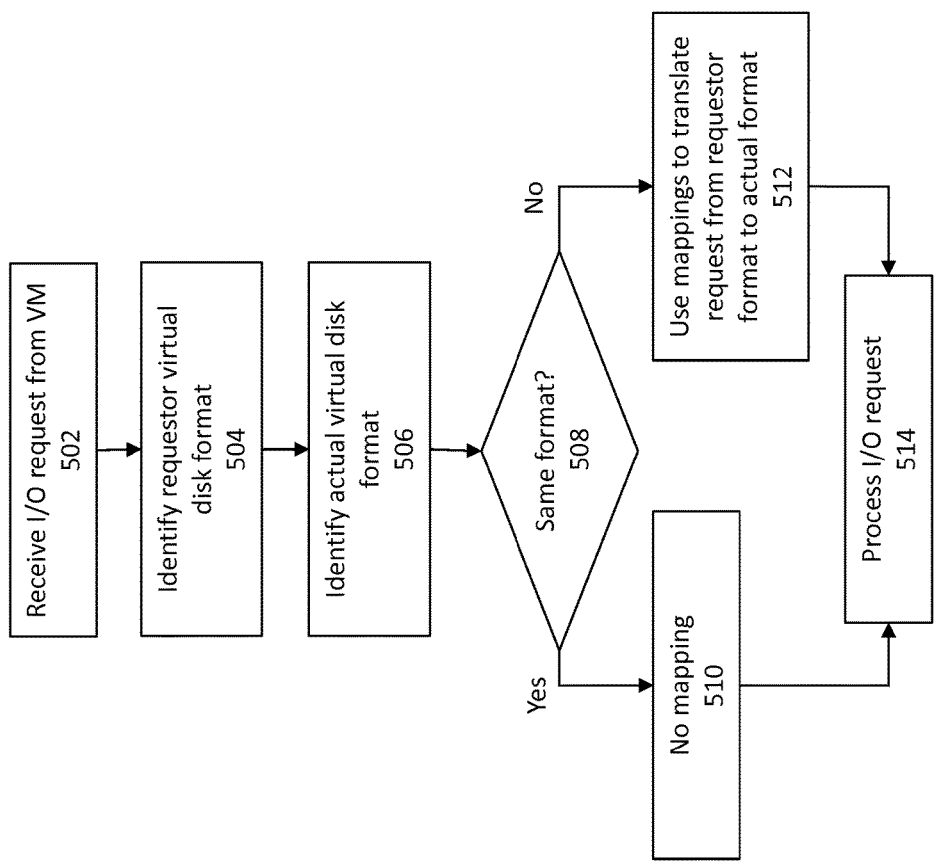
FIG. 5 illustrates a flowchart of a process for performing data mapping in accordance with some embodiments.

FIG. 5 illustrates a flowchart of a process for performing data mapping in accordance with some embodiments, so that a virtual machine (e.g., VM 304-2 as illustrated in FIG. 3) may be able to issue I/O requests to a vDisk, even if the vDisk is in a different virtual disk format. At 502, an I/O request from a VM is received. In some embodiments, the I/O request is received at a real-time mapper module implemented in a service VM.

At 504, a requestor virtual disk format (e.g., a virtual disk format of the VM making the I/O request) is identified. For example, as illustrated in FIG. 4A, the format of the VM 304 issuing the I/O request is identified as Format2. At 506, a virtual disk format of the vDisk targeted by the I/O request is identified. For example, in the embodiment illustrated in FIG. 4A, the actual format of vDisk 308 is identified as being Format1.

At 508, the identified formats of the VM and the vDisk are compared. If the VM and the vDisk both use the same format, then at 510 no mapping is performed, and the I/O request is processed normally at 514.

On the other hand, if the VM and vDisk use different formats (e.g., the VM uses Format2, while the vDisk uses Format1), then at 512, mapping is performed to translate the I/O request from the requestor virtual disk format to the actual virtual disk format, based upon the different virtual disk formats of the VM and the vDisk (e.g. as illustrated in FIGS. 4B and/or 4C). For example, portions of the I/O request directed to raw data may be mapped to different portions of raw data on the vDisk, while portions of the I/O request directed to metadata are mapped to additional metadata information created by the real-time mapper that corresponds to the vDisk raw data. Once the mapping has been performed, the I/O request is processed at 514.

Figure 6:
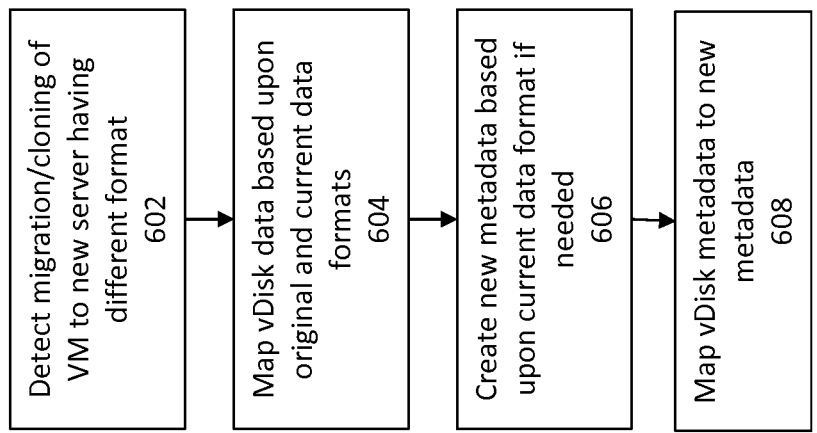
FIG. 6 illustrates a flowchart of a process for creating the mappings metadata in accordance with some embodiments.

FIG. 6 illustrates a flowchart of a process for creating the mappings metadata in accordance with some embodiments. At 602, a migration or cloning of a VM to a new server having a different virtual disk format is detected (e.g., the migration of a VM on a server using Format1 to a server using Format2). In some embodiments, detection is in response to a manual request by a system administrator or other user to migrate or clone the virtual machine. In other embodiments, the operation may be an automatic process that occurs without manual input (e.g., an automated load balancing operation). In addition, a virtual disk format of the VM's original server and current server are identified.

At 604, mappings of a vDisk associated with the VM between data of the different formats are created. For example, as illustrated in FIGS. 4B and 4C, sections of raw data of a first virtual disk format are mapped to corresponding sections of raw data of a second virtual disk format. However, while raw data may generally be mapped directly between different virtual disk formats, metadata is generally format-specific and cannot be applied to different virtual disk formats. For example, as illustrated in FIG. 4B, while sections of data file 204 of Format1 may correspond to data sections 208 of Format2, metadata file 202 of Format1 does not correspond to metadata sections 206 of Format2. Thus, at 606, new metadata based upon the current data format is created. The new metadata may be created and maintained by the real-time mapper, and in some embodiments is stored locally on the server.

At 608, mappings to the newly created metadata information are created. Thus, in response to an I/O request from the VM, requested portions of data are mapped to corresponding portions of data on the virtual disk in accordance with virtual disk formats being used, while requested portions of metadata are mapped to the created metadata information.

Lazy Conversion

Figure 7A:
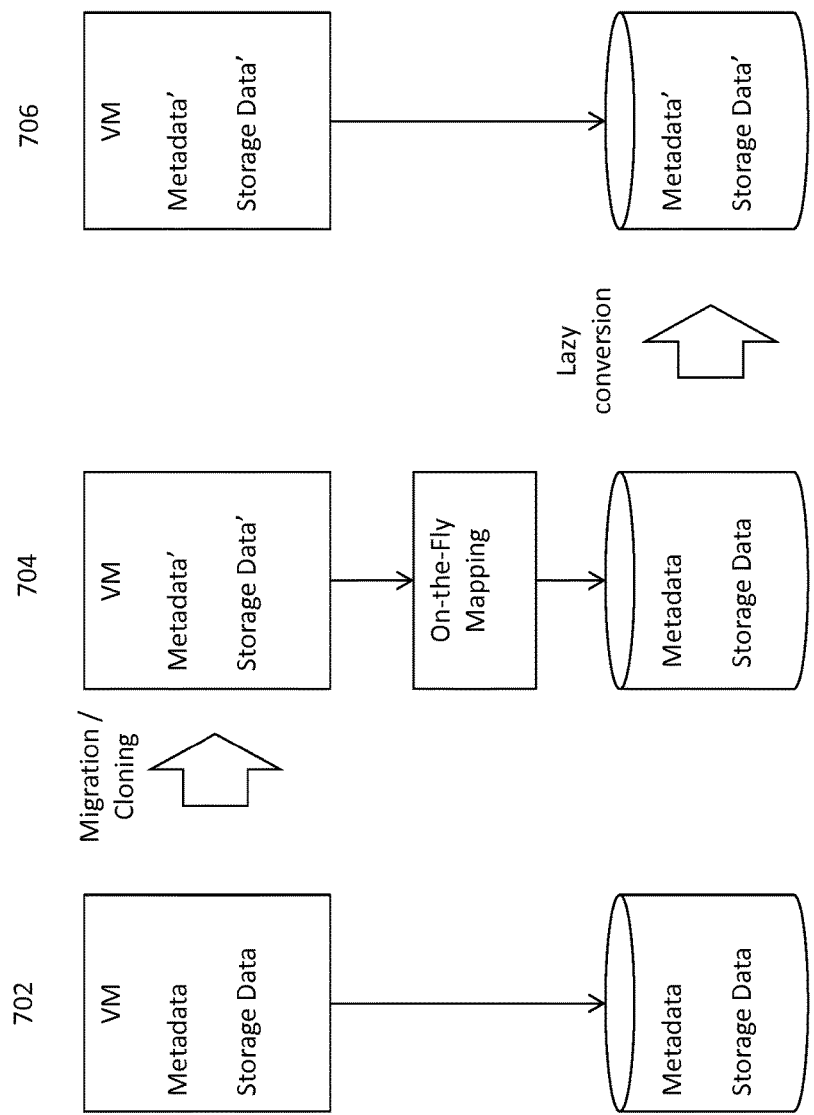
FIG. 7A illustrates a process for using a real-time mapper to be able to use a recently migrated or cloned virtual machine without downtime, while lazily or asynchronously converting the underlying data, in accordance with some embodiments.

FIG. 7 illustrates a process for using a real-time mapper to be able to use a recently migrated or cloned virtual machine without downtime, while lazily or asynchronously converting the format of the underlying data (e.g., the vDisk), in accordance with some embodiments. At 702, a virtual machine resides on a server using a first virtual disk format. Because the VM and the underlying data both use the same format, no type of mapping or conversion needed for the VM to perform I/O operations on the data.

The virtual machine is then migrated or cloned to another server that uses a different virtual disk format. This may be the result of a manual operation initiated by an administrator or other user, or an automatic operation such as an automated load-balancing assignment. At 704, no conversion to the underlying data is performed at first. Instead, mappings are created so that the VM (which now uses the second virtual disk format) can continue to operate upon the underlying data, which is still in its original format. By making use of on-the-fly or real-time mapping, the virtual machine may continue to perform operations on the underlying data despite the different virtual disk formats, without needing to perform a potentially expensive and time-consuming conversion operation on the underlying data.

During this time, the underlying data may be lazily converted from the first virtual disk format to the second virtual disk format. In some embodiments, new metadata may be created and arranged relative to the raw data based upon the particular format being converted to. For example, if converting from Format1 to Format2, new metadata may be created and inserted between sections of raw data to form a single file containing alternating sections of metadata and raw data. On the other hand, if converting from Format2 to Format1, the metadata sections located between raw data sections may be removed, and new metadata is created to form a separate metadata file.

Figure 7B:
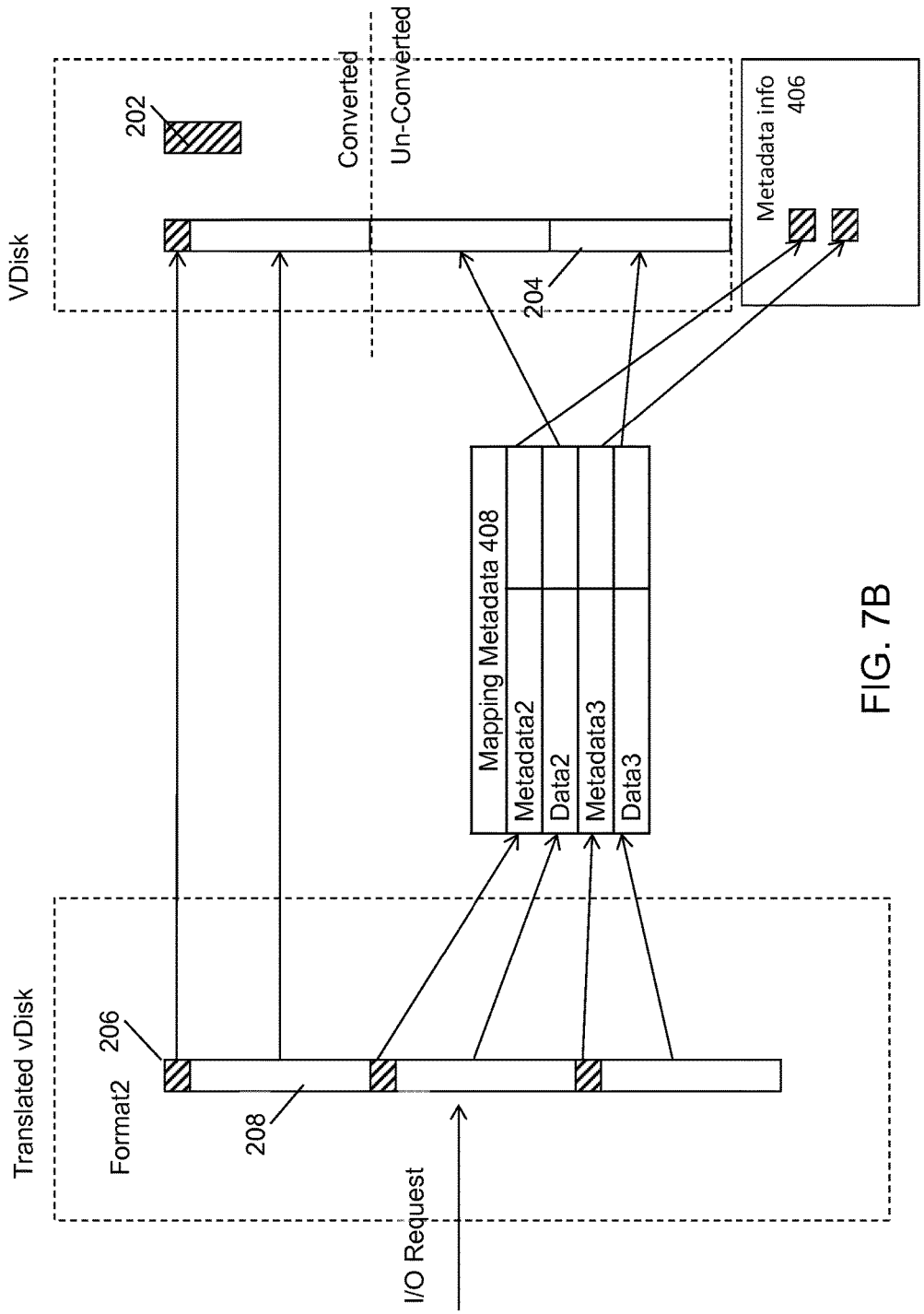
FIG. 7B illustrates a partially converted virtual disk in accordance with some embodiments.

While the conversion of the underlying data is taking place, the mapping metadata used by the on-the-fly mapping is updated, so that virtual machine may continue operating upon the underlying data. For example, I/O requests directed at portions of data that have not yet been converted will continue using the mapping metadata, while I/O requests directed to portions of data that have been converted will not need to be mapped. FIG. 7B illustrates an example mapping scheme wherein the underlying vDisk data has been partially converted from Format1 to Format2. As illustrated in FIG. 7B, requests for data on the vDisk that has already been converted simply access those portions of the vDisk directly, while requests for data on the vDisk that is still unconverted continues to be translated through the mapping metadata.

At 706, once the underlying data and metadata have been fully converted to second virtual disk format, the real-time mapper is no longer needed, and the virtual machine is able to perform I/O requests on the virtual disk directly without the need to perform any mapping.

Figure 8:
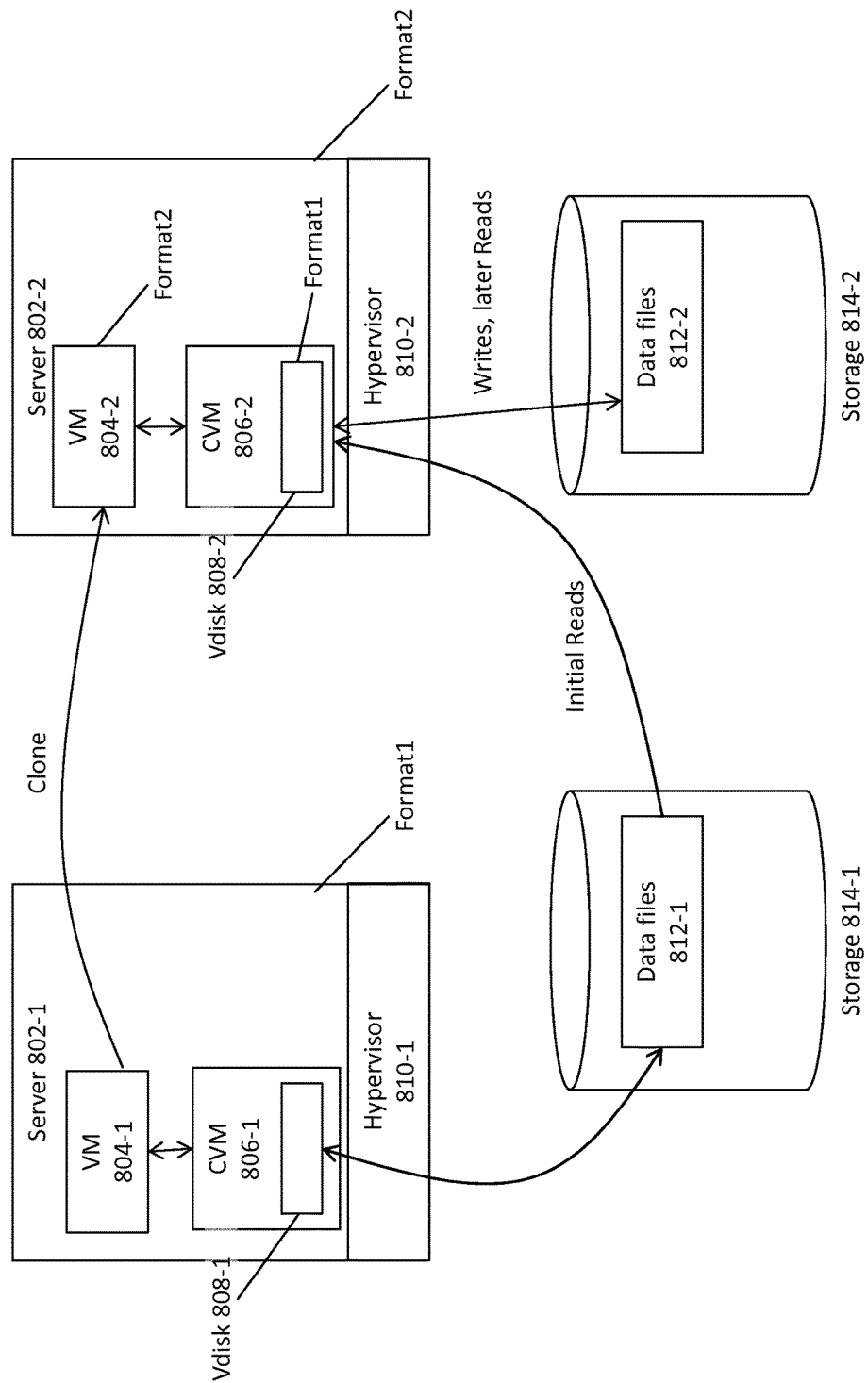
FIG. 8 illustrates an architecture for cloning a virtual machine to a server using a different virtual disk format in accordance with some embodiments.

FIG. 8 illustrates an architecture for cloning a virtual machine to a server using a different virtual disk format in accordance with some embodiments. In the illustrated embodiment, a VM 804-1 resides on a first server 802-1 that uses Format1. I/O requests from VM 804-1 are processed by a CVM 806-1 to operate upon a vDisk 808-1, which abstracts underlying data files 812-1 stored on a storage device 814-1.

At some point in time, VM 804-1 is cloned to form a VM 804-2 on a second server 802-2, which uses a different virtual disk format (e.g., Format2) from server 802-1. However, even though VM 804-2 now uses a different virtual disk format, vDisk 808-2, being a clone of vDisk 808-1, remains in its original format until a conversion operation is performed.

By using a real-time mapper, VM 804-2 is able to immediately begin reading from vDisk 808-2 and underlying data files 812-1, without the need for any downtime for performing conversion. When VM 804-2 performs write requests or updates to the underlying data, the data, instead of being written to data files 812-1, are instead written to data files 812-2 on storage device 814-2. In addition, the data written to data files 812-2 on storage device 814-2 may be in a different format from the data of data files 812-1 (e.g., a format associated with Format2, instead of Format1).

As data is written to data files 812-2, the mappings used by the real-time mapper are updated, such that further I/O requests by VM 804-2 will be mapped to either data files 812-1 or to data files 812-2, depending upon if they are directed to data had been previously written to or updated by VM 804-2.

Figure 9:
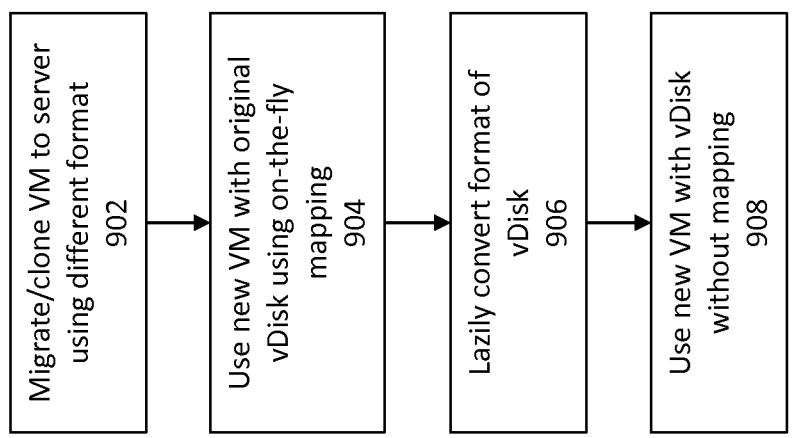
FIG. 9 illustrates a flowchart of a process for using real-time mapping in conjunction with lazy or asynchronous conversion in accordance with some embodiments.

FIG. 9 illustrates a flowchart of a process for using real-time mapping in conjunction with lazy or asynchronous conversion in accordance with some embodiments. At 902, a VM is migrated or cloned from a first server running a first format, to a second server running a second format that is different from the first format.

At 904, the virtual machine is used to issue I/O requests to underlying data. Because the underlying data has not yet been converted, the virtual disk format of the virtual machine will not match that of the underlying data. Instead, real-time mapping will be used to map I/O requests from the virtual machine to the underlying data.

At 906, the format of the underlying data is lazily converted from the first format to the second format. For example, the underlying data may be converted from Format1, wherein the metadata and raw data are stored as separate files, to Format2, wherein the metadata is dispersed between portions of raw data within a single file. In some embodiments, the conversion may take place in response to write or update requests issued by the virtual machine. As the conversion takes place, the mappings of the real-time mapper are updated to reflect the converted portions of data.

At 908, once the conversion of the underlying data is complete, the virtual machine may now be used with the underlying data without any mapping.

Application Repository

Mapping metadata between different types of virtual disk formats may also be used to facilitate the distribution and use of applications for the virtualization environment. For example, a user, such as an administrator of the virtualization environment, may wish to access an application repository and select one or more applications to instantiate in the virtualization environment. The applications may be used to improve the functionality of the virtualization environment, or add new functionalities or tools to the virtualization environment. Instantiating an application may comprise downloading the application to local storage to be used by servers in the virtualization environment, or accessing the application directly at the application repository by the servers in the virtualization environment. In some embodiments, the application repository may be in the form of an application store.

Figure 10:
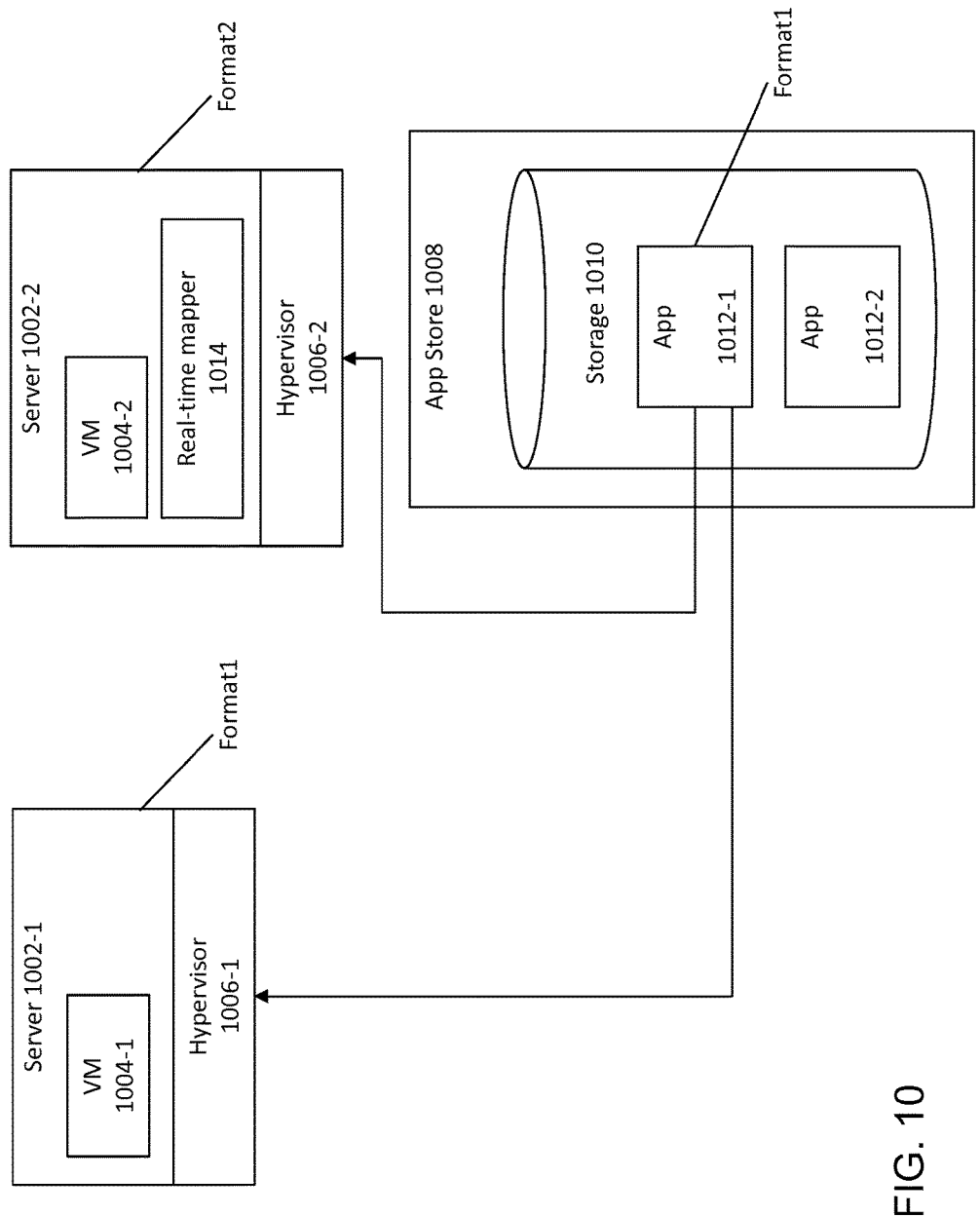
FIG. 10 illustrates a system for downloading and using an application on servers using different virtual disk formats, in accordance with some embodiments

Different virtual disk formats may require different versions of an application to be developed. For example, in many systems an application developer must create a first version of an application for servers in a virtualization environment using virtual disk Format1, and a second version of the same application for servers using virtual disk Format2. However, by using mappings metadata between different virtual disk formats, a single version of the application can be used on servers having different virtual disk formats. FIG. 10 illustrates a system for instantiating a single version of an application to servers that use different virtual disk formats, in accordance with some embodiments. The system includes a first server 1002-1 having a first VM 1004-1 and hypervisor 1006-1, and a second server 1002-2 having a second VM 1004-2 and hypervisor 1006-2. In the illustrated embodiment, first server 1002-1 uses a first virtual disk format (e.g., Format1), while second server 1002-2 uses a second virtual disk format (e.g., Format2). Both first and second servers 1002-1 and 1002-2 are able to access an application repository 1008. In some embodiments, servers 1002-1 and 1002-2 are part of the same virtualization environment, while in other embodiments, servers 1002-1 and 1002-2 may be part of different virtualization environments.

Application repository 1008 contains storage 1010 used to store data for one or more applications (e.g., applications 1012-1 and 1012-2). Applications 1012-1 and 1012-2 may be formatted for any type of virtual disk format. For example, application 1012-1 may use virtual disk Format1.

Servers 1002-1 and 1002-2 may send requests to application repository 1008 to instantiate application 1012-1. In some embodiments, servers 1002-1 and 1002-2 may download application 1012-1 to a local storage, where it may be installed and/or used. In some embodiments, servers 1002-1 and 1002-2 may access application 1012-1 directly at application repository 1008. In embodiments where servers may both read and write to data associated with an application, the servers may initially access the application at the application repository, while updates or write requests to data associated with the application may be written to a different location (e.g., local storage). Subsequently, requests to read the original data associated with the application are directed to the application repository, while requests to read updated or modified data would be directed to the different location.

In addition, in some embodiments the application may be lazily downloaded while being accessed at the application repository. This would allow the servers to be able to immediately access the application without having to wait for the full application to download to local storage.

Since server 1002-1 uses virtual disk Format1, it can download and/or use application 1012-1 directly without having to go through any type of data mapping. On the other hand, server 1002-2 uses a virtual disk format different from that of the requested application. However, instead of necessitating the creation of a new version of application 1012-1 specific to virtual disk Format2, server 1002-2 may access application 1012-1 through a real-time mapper 1014 that maps data I/O requests between Format2 and Format1. Thus, both servers 1002-1 and 1002-2 may make use of the same application 1012-1, without necessitating different versions of application 1012-1 for different virtual disk formats.

Figure 11:
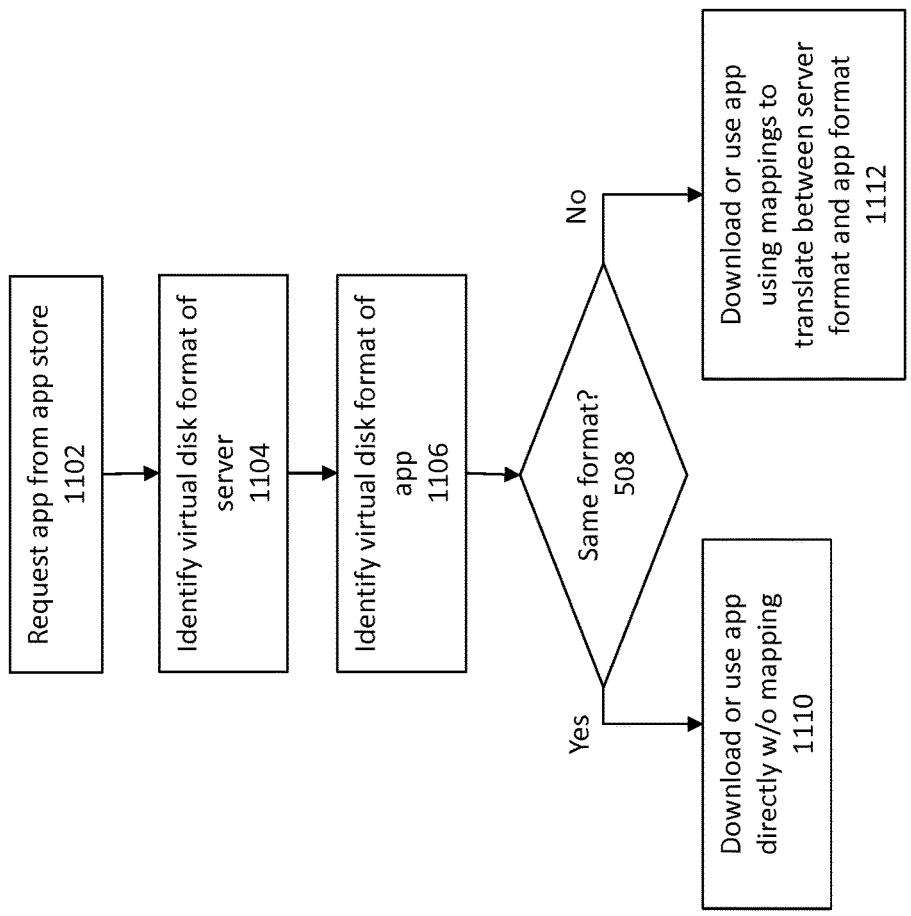
FIG. 11 illustrates a flowchart of a process for downloading and using a an application on servers using different virtual disk formats, in accordance with some embodiments.

FIG. 11 illustrates a flowchart of a process for downloading and/or using a single version of an application on servers using different virtual disk formats, in accordance with some embodiments. At 1102, a server may send a request to instantiate (e.g., download and/or access) a particular application in an application repository. In some cases, this may comprise a user, such as a system administrator, browsing a user interface associated with the application repository containing textual or graphical displays corresponding to various applications, and clicking or selecting a desired application to be downloaded or accessed.

At 1104, a virtual disk format used by the requesting server is identified, while at 1106, a virtual disk format of the requested application is identified. At 1108, the identified formats of the requesting server and the requested application are compared.

If the formats are the same, then at 1110 the server downloads or accesses the application directly. However, if the formats are different, then at 1112 the requesting server downloads or accesses the application through mappings that translate data between the virtual disk format used by the server and the virtual disk format of the application. For example, the server may download the application to local storage or another storage location, where it may be able to perform operations on the downloaded application through the mappings. Alternatively, the server may access and use the application at the application repository through the mappings metadata, without downloading the application to a different storage location.

The above-described approaches implement real-time mapping in any number of different configurations and architectures, and is especially useful for mixed-mode hypervisor clusters where one would like to seamless move VMs while the mixed-mode hypervisor shares the same container (thereby shared storage). The two types of conversions pertain to real-time and lazy conversions as discussed above. In some embodiments, the CVM on a first node/cluster may need to have knowledge about data disk formats of the source. This is beneficial, for example, to perform on-the-fly conversions for creating vdisk metadata.

In an alternate embodiment, a hypervisor agnostic approach can be provided. This approach is useful, for example, in the disaster recovery (DR) context, where for continuous data recovery, in-place updates can be performed for virtual disks. Raw disk images can be used to isolate virtual disk formats at the source and destination.

Figure 12:
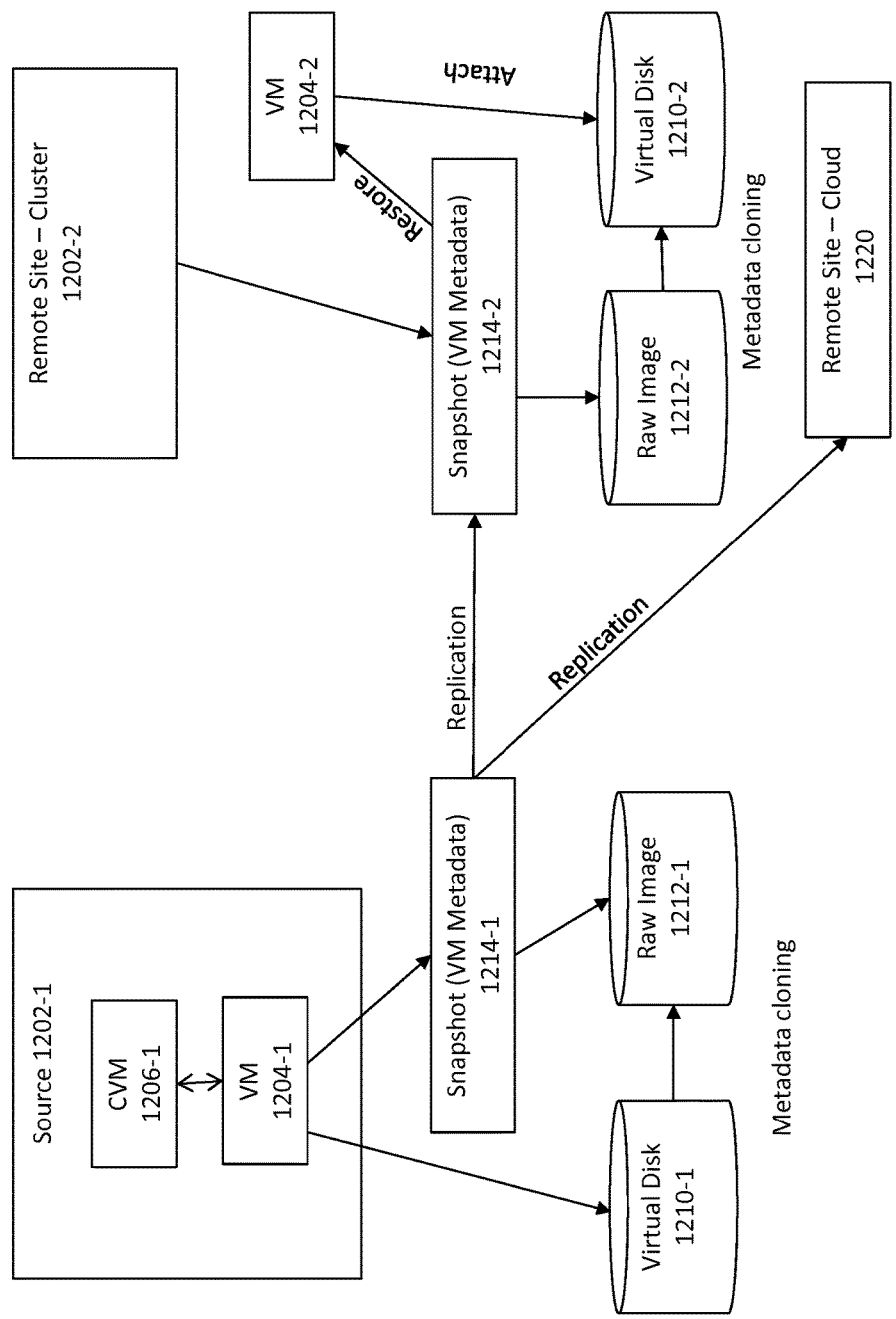
FIG. 12 illustrates a hypervisor agnostic approach.

FIG. 12 provides an illustration of this approach involving a first VM 1204-1 at a source cluster 1202-1 that accesses virtual disk 1210-1. Here, snapshots are stored in a hypervisor agnostic format (e.g., where the VM metadata is stored in snapshot record 1214-1 and the raw data (e.g., raw image 1212-1) is harvested on the source cluster 1202-1 (e.g., from CVM 1206-1). This raw conversion is performed in-place after a snapshot is generated with minimal copy of data. This approach involves a slightly different approach to implement meta-data cloning, where the raw image comprises a stream of bytes formed from meta-data cloning of the data from the virtual disk 1210-1. This may be implemented by for example, punching holes or using replication based on regions.

The data (e.g., snapshot and raw data) is then transferred to the remote site 1202-2 using a replication process. As shown in the figure, the data is replicated to the remote snapshot 1214-2 and/or the remote-site cloud infrastructure 1220. The raw image is stored at 1212-2, e.g., as a stream of bytes.

At this point, the VM 1204-2 is restored from the raw format to a local format. In the current embodiment, this action is performed in-place, and without using a lazy migration approach. As part of this process, meta-data cloning is performed of the raw image data 1212-2 to the virtual disk 1210-2, e.g., with this process performed in-place.

There are numerous advantages to this approach. One key advantage is that the solution is scalable to any type of hypervisor, and can even be replicated to third party cloud service providers (at remote site 1220), where the destination node only needs to be concerned about converting the raw data to its local format.

Therefore, what has been described is an improved architecture for implementing real-time mapping between different virtual disk formats in a virtualization environment.

System Architecture

Figure 13:
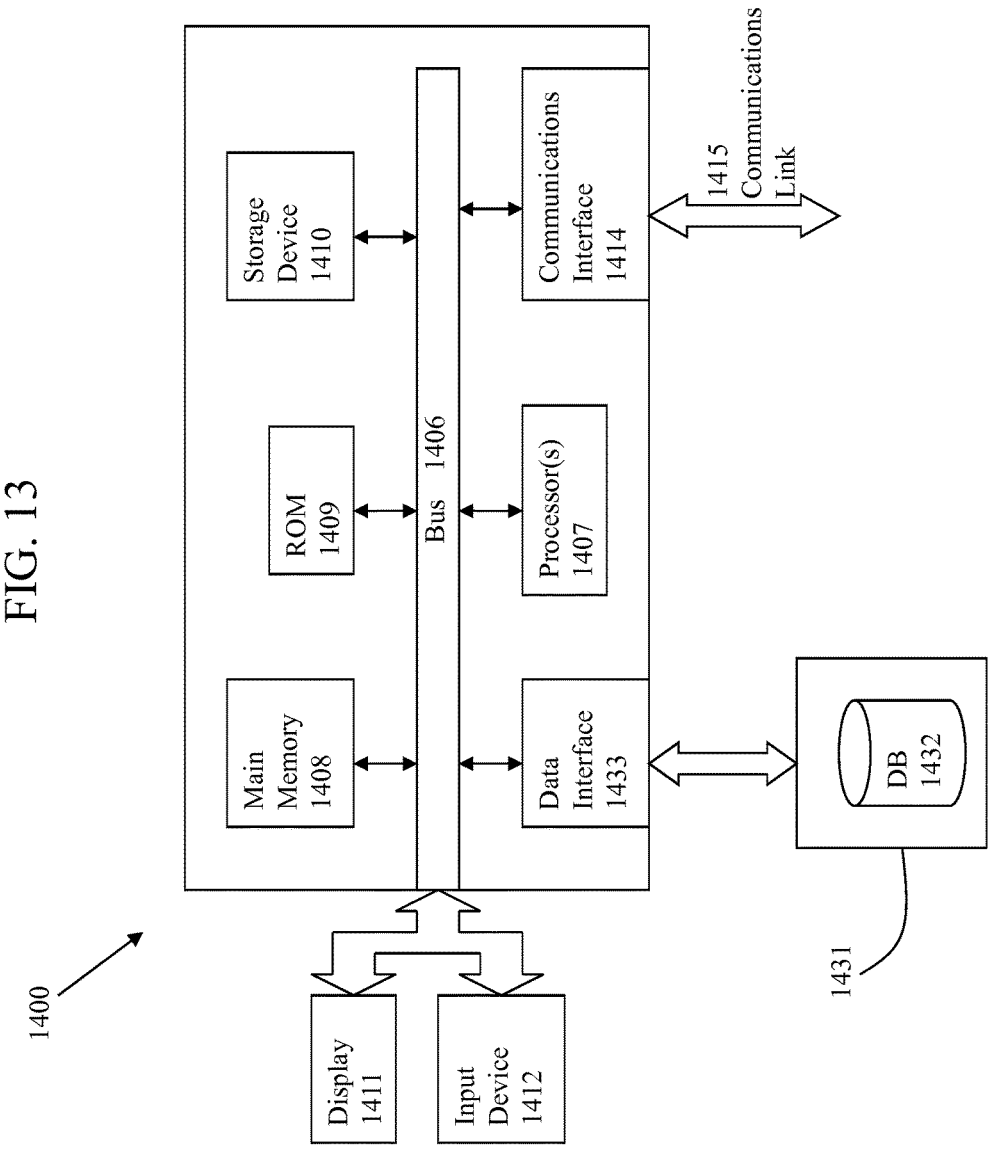
FIG. 13 is a block diagram of a computing system suitable for implementing an embodiment of the present invention.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 may be accessed in a storage medium 1431 via a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for accessing data using different virtual disk formats in a virtualization environment, comprising:
    moving a virtual machine from a first server to a second server, wherein the first server includes a first virtual disk format and the second server includes a second virtual disk format, the first virtual disk format and the second virtual disk format being different formats;
    configuring a virtual disk of the virtual machine on the second server-, wherein the virtual disk remains in the first virtual disk format;
    creating a plurality of mappings in real-time that map to data on the virtual disk, based at least in part upon the first virtual disk format and the second virtual disk format;
    operating upon the virtual disk without converting the virtual disk from the first virtual disk format to the second virtual disk format by:
        receiving an I/O request from the virtual machine running on the second server directed to the virtual disk, wherein the I/O request uses the second virtual disk format, and
        processing the I/O request on the virtual disk via the mappings.

2. The method of claim 1, wherein the virtual machine is moved based at least in part on a manual request by a system administrator.

3. The method of claim 1, wherein the virtual machine is moved based at least in part on an automated load balancing.

4. The method of claim 1, further comprising creating additional metadata information for data on the virtual disk, based at least in part upon the second virtual disk format.

5. The method of claim 4, wherein the plurality of mappings further comprise mappings to the additional metadata.

6. The method of claim 1, further comprising:
    receiving a second I/O request directed to the virtual disk;
    identifying a virtual disk format associated with the second I/O request;
    identifying a virtual disk format of the virtual disk;
    comparing the virtual disk format associated with the second I/O request with the virtual disk format of the virtual disk; and
    if it is determined that the virtual disk format associated with the second I/O request is different from the virtual disk format of the virtual disk, processing the I/O request on the virtual disk using the mappings; and
    otherwise, processing the I/O request on the virtual disk without using the mappings.

7. The method of claim 1, further comprising:
    at a later time, converting at least a portion of the virtual disk from the first virtual disk format to the second virtual disk format; and
    updating the mappings based at least in part upon the converted portion of the virtual disk.

8. The method of claim 1, wherein converting at least a portion of the virtual disk is performed in response to a received write request.

9. A computer-implemented method, comprising:
    identifying a request from a server in a virtualization environment to instantiate an application;
    identifying a virtual disk format associated with the server;
    identifying a virtual disk format of the application;
    comparing the virtual disk format associated with the server with the virtual disk format of the application;
    if it is determined that the virtual disk format associated with the server is different from the virtual disk format of the application, instantiating the application with a plurality of mappings that map between the virtual disk format of the server and the virtual disk format of the application without creating a new version of the application having a virtual disk format of the server; and
    otherwise, instantiating the application to the server without using the mappings.

10. The method of claim 9, wherein instantiating the application comprises downloading the application.

11. The method of claim 9, wherein the application is stored at an application repository, and instantiating the application comprises reading the application from the application repository.

12. A system, comprising:
    a computer processor to execute a set of program code instructions; and
    a memory to hold the program code instructions, in which the program code instructions comprises program code to perform: moving a virtual machine from a first server to a second server, wherein the first server includes a first virtual disk format and the second server includes a second virtual disk format, the first virtual disk format and the second virtual disk format being different formats; configuring a virtual disk of the virtual machine on the second server, wherein the virtual disk remains in the first virtual disk format; creating a plurality of mappings in real-time that map to data on the virtual disk, based at least in part upon the first virtual disk format and the second virtual disk format; operating upon the virtual disk without converting the virtual disk from the first virtual disk format to the second virtual disk format by: receiving an I/O request from the virtual machine running on the second server directed to the virtual disk, wherein the I/O request uses the second virtual disk format and processing the I/O request on the virtual disk via the mappings.

13. The system of claim 12, wherein the virtual machine is moved based at least in part on a manual request by a system administrator.

14. The system of claim 12, wherein the virtual machine is moved based at least in part on an automated load balancing.

15. The system of claim 12, in which the program code instructions further comprises instructions for creating additional metadata information for data on the virtual disk, based at least in part upon the second virtual disk format.

16. The system of claim 15, wherein the plurality of mappings further comprise mappings to the additional metadata.

17. The system of claim 12, in which the program code instructions further comprises instructions for: receiving a second I/O request directed to the virtual disk; identifying a virtual disk format associated with the second I/O request; identifying a virtual disk format of the virtual disk; comparing the virtual disk format associated with the second I/O request with the virtual disk format of the virtual disk; if it is determined that the virtual disk format associated with the second I/O request is different from the virtual disk format of the virtual disk, processing the I/O request on the virtual disk using the mappings; and otherwise, processing the I/O request on the virtual disk without using the mappings.

18. The system of claim 12, in which the program code instructions further comprises instructions for, at a later time, converting at least a portion of the virtual disk from the first virtual disk format to the second virtual disk format, and updating the mappings based at least in part upon the converted portion of the virtual disk.

19. The system of claim 12, wherein converting at least a portion of the virtual disk is performed in response to a received write request.

20. A system, comprising:
a computer processor to execute a set of program code instructions; and
a memory to hold the program code instructions, in which the program code instructions comprises program code to perform: identifying a request from a server in a virtualization environment to instantiate an application; identifying a virtual disk format associated with the server; identifying a virtual disk format of the application; comparing the virtual disk format associated with the server with the virtual disk format of the application; if it is determined that the virtual disk format associated with the server is different from the virtual disk format of the application, instantiating the application with a plurality of mappings that map between the virtual disk format of the server and the virtual disk format of the application without creating a new version of the application having a virtual disk format of the server; and otherwise, instantiating the application to the server without using the mappings.

21. The system of claim 20, wherein instantiating the application comprises downloading the application.

22. The system of claim 20, wherein the application is stored at an application repository, and instantiating the application comprises reading the application from the application repository.

23. A computer program product embodied in a non-transitory computer readable medium, the computer readable medium having stored thereon a sequence of instructions which, when executed by a processor causes the processor to execute a process comprising:
moving a virtual machine from a first server to a second server, wherein the first server includes a first virtual disk format and the second server includes a second virtual disk format, the first virtual disk format and the second virtual disk format being different formats;
configuring a virtual disk of the virtual machine on the second server-, wherein the virtual disk remains in the first virtual disk format;
creating a plurality of mappings in real-time that map to data on the virtual disk, based at least in part upon the first virtual disk format and the second virtual disk format;
operating upon the virtual disk without converting the virtual disk different from the first virtual disk format to the second virtual disk format by:
receiving an I/O request from the virtual machine running on the second server directed to the virtual disk, wherein the I/O request uses the second virtual disk format, and
processing the I/O request on the virtual disk via the mappings.

24. The computer program product of claim 23, wherein the virtual machine is moved based at least in part on a manual request by a system administrator.

25. The computer program product of claim 23, wherein the virtual machine is moved based at least in part on an automated load balancing.

26. The computer program product of claim 25, where the sequence of instructions further comprises instructions for creating additional metadata information for data on the virtual disk, based at least in part upon the second virtual disk format.

27. The computer program product of claim 26, wherein the plurality of mappings further comprise mappings to the additional metadata.

28. The computer program product of claim 23, where the sequence of instructions further comprises instructions for:
receiving a second I/O request directed to the virtual disk;
identifying a virtual disk format associated with the second I/O request;
identifying a virtual disk format of the virtual disk;
comparing the virtual disk format associated with the second I/O request with the virtual disk format of the virtual disk; and
if it is determined that the virtual disk format associated with the second I/O request is different from the virtual disk format of the virtual disk, processing the I/O request on the virtual disk using the mappings; and
otherwise, processing the I/O request on the virtual disk without using the mappings.

29. The computer program product of claim 23, where the sequence of instructions further comprises instructions for:
at a later time, converting at least a portion of the virtual disk from the first virtual disk format to the second virtual disk format; and
updating the mappings based at least in part upon the converted portion of the virtual disk.

30. The computer program product of claim 23, wherein converting at least a portion of the virtual disk is performed in response to a received write request.

31. A computer program product embodied in a non-transitory computer readable medium, the computer readable medium having stored thereon a sequence of instructions which, when executed by a processor causes the processor to execute a process comprising:
- identifying a request from a server in a virtualization environment to instantiate an application;
- identifying a virtual disk format associated with the server;
- identifying a virtual disk format of the application;
- comparing the virtual disk format associated with the server with the virtual disk format of the application;
- if it is determined that the virtual disk format associated with the server is different from the virtual disk format of the application, instantiating the application with a plurality of mappings that map between the virtual disk format of the server and the virtual disk format of the application without creating a new version of the application having a virtual disk format of the server; and
- otherwise, instantiating the application to the server without using the mappings.

32. The computer program product of claim 31, wherein instantiating the application comprises downloading the application.

33. The computer program product of claim 31, wherein the application is stored at an application repository, and instantiating the application comprises reading the application from the application repository.

* * * * *